United States Patent [19]

Lynch

[11] 4,053,221

[45] Oct. 11, 1977

[54] MULTI-MODE REPRODUCING APPARATUS

[75] Inventor: Thomas Lynch, Fairport, N.Y.

[73] Assignee: Xerox Corporation, Stamford, Conn.

[21] Appl. No.: 621,898

[22] Filed: Oct. 14, 1975

[51] Int. Cl.2 ........................ G03G 15/28; G03B 27/70

[52] U.S. Cl. .......................................... 355/60; 355/8; 355/66

[58] Field of Search ........................ 355/57, 60, 55, 56, 355/58, 59, 66, 63, 8, 11, 18, 49, 51, 65, 77

[56] References Cited

U.S. PATENT DOCUMENTS

| | | | |
|---|---|---|---|
| 3,476,478 | 11/1969 | Rees, Jr. | 355/60 X |
| 3,521,950 | 7/1970 | Gardner et al. | 355/3 R |
| 3,733,128 | 5/1973 | Naumann et al. | 355/57 X |
| 3,779,642 | 12/1973 | Ogawa et al. | 355/55 |
| 3,832,057 | 8/1974 | Shogren | 355/8 |
| 3,837,743 | 9/1974 | Amemiya | 355/60 |
| 3,865,482 | 2/1975 | Bendall et al. | 355/57 X |
| 3,900,258 | 8/1975 | Hoppner et al. | 355/51 |
| 3,936,150 | 2/1976 | Ikeda | 355/60 X |

*Primary Examiner*—Donald A. Griffin
*Attorney, Agent, or Firm*—James J. Ralabate; Michael H. Shanahan; Paul Weinstein

[57] ABSTRACT

A multi-mode reproducing apparatus which includes means for copying documents selectively at a plurality of copy image magnifications. An imaging surface is arranged for movement at a given velocity. Optical elements are provided for viewing a document and for projecting an image thereof onto the moving imaging surface. The optical elements include a first stationary lens for projecting the image onto the surface at a first projected image magnification, and a second lens arranged for movement between a first stored position where it is inoperative and a second position where it is operative to project an image of the document onto the surface at a second projected image magnification different from the first magnification.

15 Claims, 4 Drawing Figures

MULTI-MODE REPRODUCING APPARATUS

CROSS REFERENCE TO RELATED APPLICATIONS

U.S. Application Ser. No. 588,973, filed June 20, 1975, to Allis now U.S. Pat. No. 40 13361 issued 3/22/77 for an optical apparatus and reproducing machine; and U.S. application Ser. No. 673,228, filed Apr. 2, 1976, to Schneider for a drive system for a multi-mode reproducing apparatus, which in turn is a continuation in part, of U.S. application, Ser. No. 601.553, filed Aug. 4, 1975.

BACKGROUND OF THE INVENTION

This invention relates to a multi-mode reproducing apparatus preferably of the electrostatographic type. The apparatus includes means for copying documents selectively at a plurality of magnifications.

A variety of electrostatographic reproducing machines are commercially employed which have different modes of operation. One type of machine utilizes a moving original exposure system wherein an original document is moved past a fixed slit optical system for projecting an image onto the moving photoconductive surface. These machines include a means for changing the magnification of the projected image to provide reduction copies. Exemplary of patents in this area is U.S. Pat. No. 3,076,392, to Cerasani et al, and 3,649,114 to Vlach et al.

Other machines have been adapted to copy stationary original documents at a variety of magnifications or reductions through the use of a scanning optical system. Exemplary of patents in this area are U.S. Pat. Nos. 3,476,478, to Rees, Jr.; 3,542,467 to Furgeson; 3,614,222 to Post; and 3,837,743 to Amemiya. Another approach which has been utilized for projecting images for reproducing at varying magnifications from a stationary original comprises full frame exposure. Exemplary of patents in this area are U.S. Pat. Nos. 3,543,289 to Koizumi; 3,687,544 to Muller; 3,703,334 to Knechtel; and German Offenlegungsschrift 2,154,944 to Libby.

U.S. Pat. Nos. 3,703,334 to Knechtel and 3,837,,743 to Anemiya set forth above are also significant in that they disclose the use of a separate reflector or add reflectors, respectively, which are selectively positionable in the optical path for changing the conjugate distance of the optical system for providing varying magnifications.

The aforenoted machines are adapted to provide one or more modes of copying having different magnifications. In the optical systems of these machines, some means is usually provided for changing the conjugate relationship of the object and image sides of the projection lens. This may be accomplished by translating the lens between different positions for different projected image magnifications or in accordance with an alternative approach by utilizing more than one lens whereby different lenses are selectively positionable in the optical path, depending upon the projected image magnification desired. See, for example U.S. Pat. No. 3,779,642 to Ogawa.

The systems which are described in the various patents and applications above noted are probably well suited for their intended purposes. Those systems can be readily applied to machines which will be newly built. There already exists, however, a substantial number of reproducing machines in commercial use which are adapted to provide copies of a document at a single projected image magnification. A variety of optical systems have been utilized to provide the optical exposure in these commercial units. Modification of those optical systems to provide multiple modes of projected image magnification would require extensive alteration. In accordance with the present invention it is desired to modify the optical systems to provide variable magnification in a way which can be readily implemented in existing machines with a minimum of alteration.

Other forms of multi-mode copiers are available commercially. For example, in the Xerox 3100 LDC machine an optical system is provided which enables the machine to copy from a stationary original in a first scanning mode or from a moving original in a second fixed optical mode. This latter mode is particularly adapted for copying documents larger than the conventional viewing platen size. U.S. Pat. No. 3,900,258 to Hoppner et al [1] is illustrative of a machine similar in many respects to the 3100 LDC machine.

Reproducing apparatuses including the capability of making copies from both moving and stationary originals are also described in U.S. Pat. No. 3,833,296 to Vola, and in IBM Technical Disclosure Bulletin, Vol. 12, No. 1, at page 173, June 1969.

It has been found desirable, to provide a multimode reproducing apparatus having various unique features of the 3100 LDC machine, including its extremely compact size, but also having the capability of reduction copying.

One approach to such a machine is described in U.S. application Ser. No. 588,971 to Hoppner et al [2]. In that application a multimode reproducing apparatus is provided including both moving and stationary original exposure modes, with at least two modes of moving original exposure at differing copy image magnifications.

In the apparatus of the Hoppner et al [2] application, only two modes of moving original exposure are shown although additional modes could be provided. One at a nominal magnification wherein the add mirror is positioned out of the optical path and one at a reduced magnification wherein the add mirror is positioned in the optical path.

SUMMARY OF THE INVENTION

In accordance with the present invention it is desired to provide a multi-mode reproducing apparatus which includes means for copying documents selectively at a plurality of copy image magnifications.

The apparatus includes an imaging surface arranged for movement at a given velocity. Optical means are provided for viewing a document and for projecting an image thereof onto the moving imaging surface. The optical means includes a first stationary lens for projecting the image onto the surface at a first projected image magnification, and a second lens arranged for movement between a first stored position where it is inoperative and a second position where it is operative to project an image of the document onto the surface at a second projected image magnification different from the first magnification.

Normally, the first lens is arranged along a first optical ray path between the document and the imaging surface. The second lens in its operative position is arranged along a different optical ray path from the document to the imaging surface, and a conjugate changing means is provided to switch between the first and second optical ray paths.

The first lens is arranged for movement to the inoperative position in order to avoid optical interference between it and the first optical ray path. Preferably, in accordance with the present invention both the conjugate changing means and the second lens are independent of the optical system, when the first projected image magnification is employed.

In accordance with an alternative embodiment the apparatus includes means for viewing a stationary document in a first mode of operation and for projecting an image thereof onto the imaging surface. In a second mode of operation the document is moving at a first velocity synchronized to the velocity of the moving imaging surface and the viewing means projects an image thereof at a desired magnification onto the imaging surface. The viewing means in the first and second modes of operation includes a stationary lens positioned along an optical ray path from the document to the imaging surface. A means is provided for viewing a document moving at a second velocity synchronized to the velocity of the moving imaging surface in a third mode of operation and for projecting an image thereof onto the moving imaging surface at a magnification different from the second mode magnification. The second velocity being different from the first velocity. The viewing means in the third mode of operation includes a second lens arranged for movement between a first stored position where it is inoperative and a second position along a second optical ray path from the document to the imaging surface where it is operative to project an image of the document onto the surface at the second projected image magnification.

A conjugate changing means is provided which is effective to switch between the first optical ray path and the second optical ray path depending on the desired projected image magnification whereby either the stationary lens or the movable lens are selectively employed for projecting the desired projected image. Preferably, as in the previous embodiment, both the second lens and the conjugate changing means are independent of the viewing system in the first and second modes of operation.

Preferably, in the first mode of operation the viewing means includes optical means for scanning the stationary document, and in the second mode of operation the viewing means includes means for fixing the scanning optical means at a given position and document feeding means for moving the document past the viewing domain of the fixed scanning optics. Preferably, in the third mode of operation the scanning optical means continues to be fixed.

Accordingly, it is an object of this invention to provide an improved variable magnification reproducing apparatus.

It is a further object of this invention to provide an optical means for modifying an optical system to vary its projected image magnification.

It is a still further object of this invention to provide an apparatus as above including a stationary lens and at least one lens movable between an operative and inoperative positions.

These and other objects will become more apparent from the following description and drawings.

DETAILED DESCRIPTION OF THE PREFERRED EMBODIMENTS

In the background of this invention there has been set out a number of patents dealing with reproducing apparatuses adapted to function in one or more modes of operation. Some of the apparatuses are capable of imaging from a moving or a stationary document and some of the apparatuses are capable of making copies in a variety of selected magnifications including reductions.

When one attempts to combine these modes of operation in a single reproducing apparatus of a fairly compact nature significant problems arise because of the necessity in a reduction mode of operation to change the conjugate distance relationship on the object and image sides of the lens.

In accordance with the present invention a magnification changing mechanism is employed which is preferably independent of the optical system of the apparatus when it is operated in a normal or base magnification mode. Therefore, a reproducing apparatus having a conventional single magnification mode optical system can be modified to include additional magnification modes with a minimum of alteration. This, easy retrofitability represents a substantial improvement compared with prior art systems.

Figure 1:
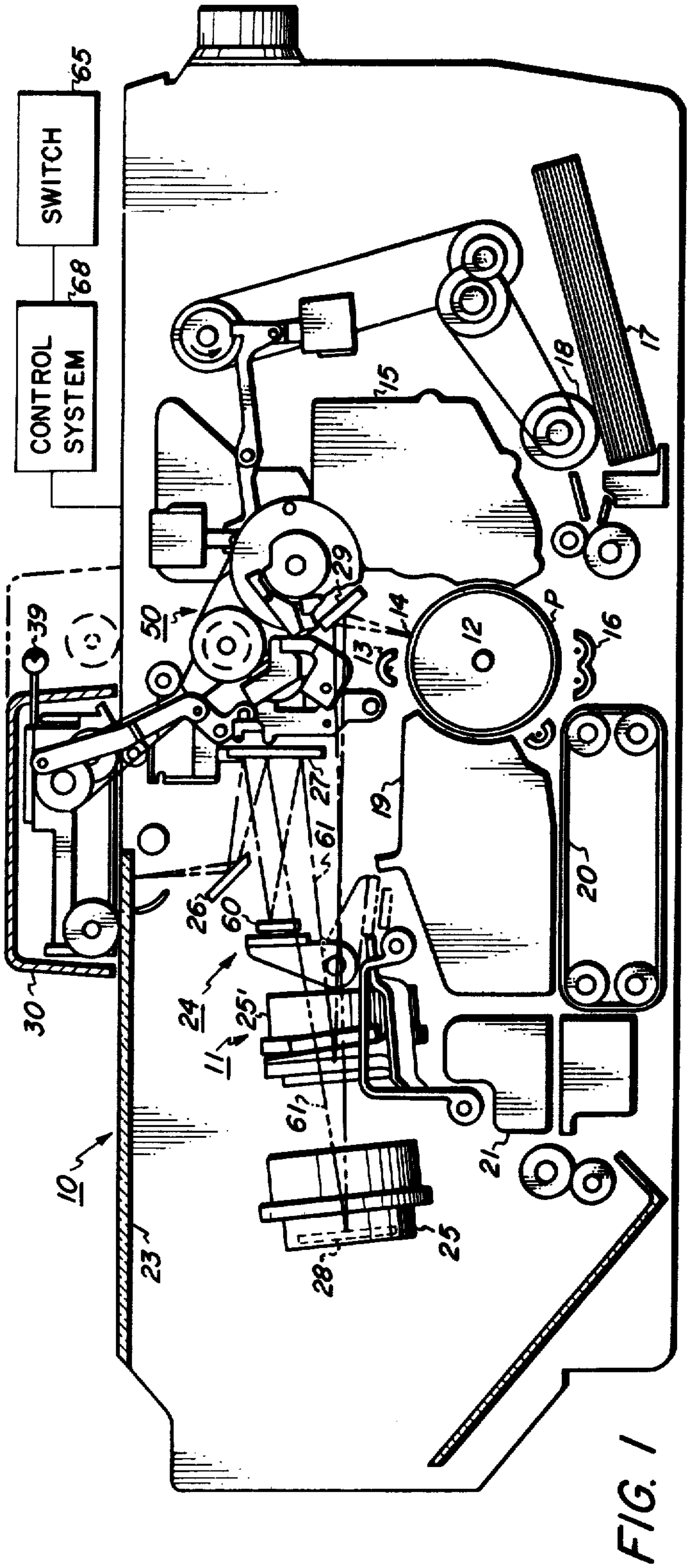
FIG. 1 is a schematic side view of a reproducing apparatus in accordance with the present invention.
Figure 2:
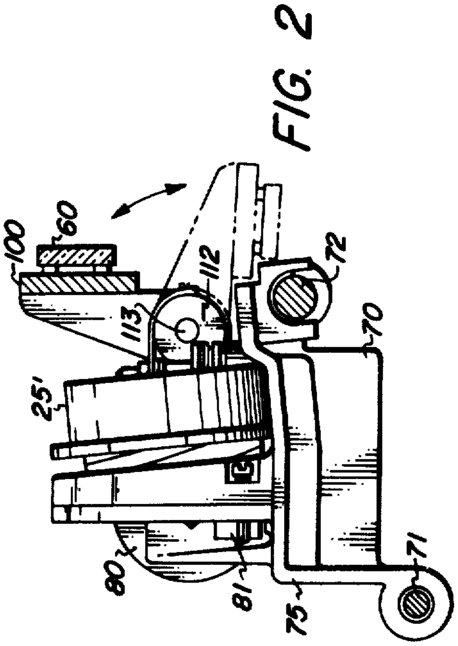
FIG. 2 is a partial side sectional view along line 2—2 in FIG. 4 of the magnification changing mechanism in the apparatus of FIG. 1.
Figure 3:
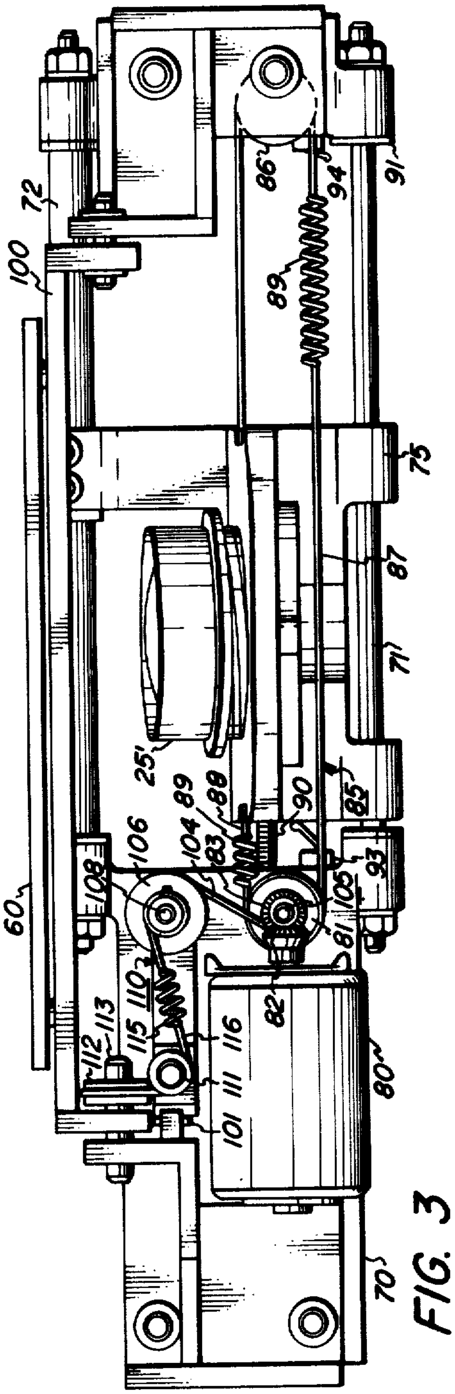
FIG. 3 is a top view of the magnification changing mechanism employed in the apparatus of FIG. 1.
Figure 4:
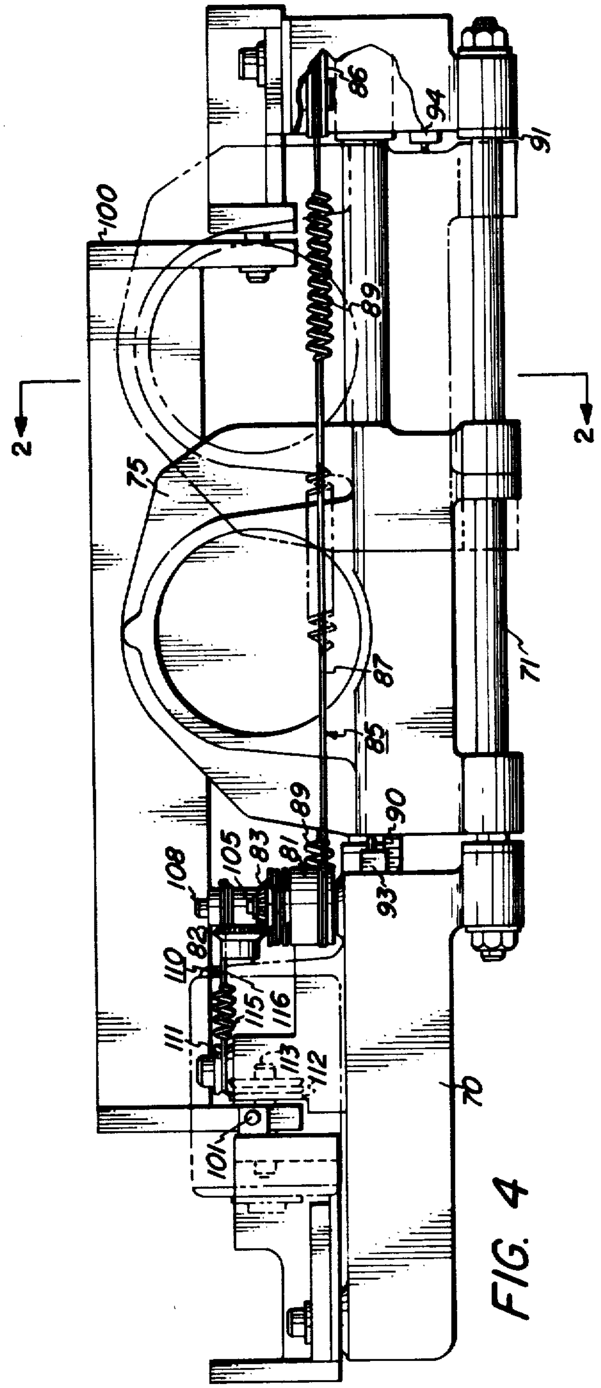
FIG. 4 is a rear view of the magnification changing mechanism in the apparatus of FIG. 1, without the lens.

Referring now to FIG. 1, there is shown by way of example an electrostatographic reproducing machine 10 which incorporates the magnification changing apparatus 11 of the present invention. The reproducing machine 10 depicted in FIG. 1 illustrates the various components utilized therein for xerographically producing copies from an original. Although the apparatus of the present invention is particularly well adapted for use in an automatic xerographic reproducing machine 10, it should become evident from the following description that it is equally well suited for use in a wide variety of electrostatographic systems and is not necessarily limited in its application to the particular embodiment shown herein.

Basically, the xerographic processor includes a rotatably mounted photoconductive drum P which is supported upon a horizontally extended shaft 12. The drum is driven in the direction indicated whereby its photoconductive surface is caused to pass sequentially through a series of xerographic processing stations.

The practice of xerography is well-known in the art, and is the subject of numerous patents and texts, including Electrophotography by Schaffert, published in 1965, and *Xerography and Related Processes*, by Dessauer and Clark, published in 1965. Therefore, the various processing steps involved will be briefly explained below in reference to FIG. 1. Initially, the photoconductive drum surface is uniformly charged by means of a corona generator 13 positioned within a charging station located at approximately the 12 o'clock drum position. The charged drum surface is then advanced into an imaging station 14 wherein a flowing light image of an original document to be reproduced is projected onto the charged drum surface thus recording on the drum a latent electrostatic image containing the original input scene information. Next, subsequent to the exposure step in the direction of drum rotation is a developing station 15 wherein the latent electrostatic image is rendered visible by applying an electroscopic marking powder (toner) to the photoreceptor surface in a manner well known and used in the art. The now visible image is then forwarded into a transfer station 16 wherein a sheet of final support material is brought into overlying moving contact with the toner image and the image transferred from the plate to the support sheet by means of a second corona generator 16.

In operation, a supply of cut sheets are supported within the machine by means of a paper cassette 17. A pair of feed rollers 18 are arranged to operatively engage the uppermost sheet in the cassette so as to first separate the top sheet from the remainder of the stack and then advance the sheet into the transfer station in synchronous moving relationship to the developed image on the photoconductive plate surface. The motion of the feed rollers is coordinated with that of the rotating drum surface, as well as the other machine components through the main drive system whereby the support sheet is introduced into the transfer station in proper registration with the developed toner image supported on the xerographic plate. For further information concerning this type of sheet feeding mechanism, reference may be had to U.S. Pat. No. 3,731,915 to Guenther.

After transfer, but prior to the reintroduction of the imaged portion of the drum into the charging station, the plate surface is passed through a cleaning station 19 wherein the residual toner remaining on the plate surface is removed. The removed toner particles are collected within a container where they are stored subject to periodic removal from the machine.

Upon completion of the image transfer operation, the toner bearing support sheet is stripped from the drum surface and placed upon a moving vacuum transport 20 which serves to advance the support sheet into a thermal fusing station 21 wherein the toner image is permanently fixed to the sheet. The copy sheet with the fused image thereon is forwarded from the fuser into a collecting tray 22 where the sheet is held until such time as the operator has occasion to remove it from the machine.

Normally, when the copier is operated in a conventional mode, the original document to be reproduced is placed image side down upon a horizontal transparent viewing platen 23 and the stationary original then scanned by means of the moving optical system 24. The scanning system 24 fundamentally consists of a lens 25 positioned below the right hand margin of the platen as viewed in FIG. 1, and a pair of cooperating movable scanning mirrors 26 and 27. The lens is basically a half-lens objective having a reflecting surface 28 at the stop position to simulate a full lens system. The two mirrors are slidably supported between a pair of parallel horizontally aligned guide rails (not shown). For a further description and greater details concerning this type of optical scanning system reference is had to U.S. Pat. No. 3,832,057 to Shogren.

In practice, mirror 26, herein referred to as the full rate scan mirror, is caused to move from a home position, direcly below the left hand margin of the platen to an end of scan position below the opposite margin of the platen. The rate of travel of the scan mirror is synchronized to the peripheral speed of the rotating xerographic drum surface P. The second mirror 27 is simultaneously caused to move in the same direction as the scanning mirror at half the scanning rate. As the two mirrors sweep across the platen surface, an image of each incremental area thereon viewed by the scanning mirror is reflected towards the second mirror which, in turn, redirects the image back to the half lens system. The reflecting surface, positioned at the lens stop position, reverses the entering light rays and redirects the light rays back towards a stationary mirror 29 positioned directly above the drum surface at the exposure station 14. In this manner a flowing light image containing the original input scene information is focused upon the charged photoconductive plate.

A wind up spring (not shown) is provided to restore the moving mirrors to start of scan condition.

The copying apparatus 10 shown in FIG. 1 is provided with a document feeder 30. The document feeder 30 is movable between a first stored position adjacent to the viewing platen 23 and a second operative position over the platen surface. Commensurate with the positioning of the feeder assembly over the platen, the moving optical system 24 is locked in a position to view documents as they are advanced by the document feeder over the platen and record a flowing light image of the input information upon the moving photoconductive plate surface P.

During one mode of operation, that is, when the moving optics are utilized to provide a flowing light image of the stationary original, the document feeding assembly is maintained in a stored position (as depicted by the phantom lines shown in FIG. 1) to expose the entire platen surface area and thus provide a maximum working area for the operator.

To initiate the moving document mode of operation, the machine operator simply advances the document feeding assembly 30 from the stored position to a document feeding position with the feeding assembly extending over the left hand margin of the platen surface.

The document feeder 30 is arranged to move the document at a velocity which is synchronous with the velocity of the photosensitive surface P. It is not necessary, however, for the document velocity to be the same as that of the photosensitive surface, but merely that it be proportionally related and synchronized with it. For example, for a 1:1 magnification mode of operation the document would move at the peripheral velocity of the drum. For a reduced magnification mode of operation the document would move at a proportionally increased velocity as compared to the peripheral velocity of the drum.

This synchronization can be accomplished by using a common drive motor for both the drum and the document feeder as in the case, for example, in a Xerox 3100 LDC copier. A further description of such a drives approach may be had by reference to the Hoppner et al patent noted in the background.

In practice, at the start of the moving document handling conversion cycle, the machine operator grasps the lever arm 39 mounted on the document feeder and rotates the arm in a clockwise direction. Movement of the arm in a clockwise direction causes the movable document feeder assembly 30 to be advanced toward the fully extended or operative position. Rotation of the arm in the opposite direction produces the opposite result.

Manually moving the document feeder 30 to the extended position also physically closes the contacts of a large document mode switch (not shown) causing a signal to be sent to the main machine drive motor (not shown) actuating the motor. At the same time, a signal is also sent to the machine logic control system placing the machine in a single copy mode of operation. This latter step is required in order to move the optical system from its normal rest position, which is the start of scan position at the left hand end of the platen surface, to the end of scan position beneath the now fully extended feed roll assembly. However, during this initial conversion phase, no original is actually being processed and there is, therefore, no need to feed copy sheets through the copier. In point of fact, feeding a copy sheet during the conversion phase would have a deleterious effect on the various machine components as well as confusing the machine programming and registering system. To prevent this occurrence, means 50, as shown in FIG. 1, are provided for inhibiting the action of the paper feeder during the period when the machine is being converted to the moving document mode of operation. Means 50 also provide for locking the optics at the end of scan position during the moving original mode of operations. Means 50 comprise a lock-out mechanism which serves to both uncouple the drive shaft from the main drive system and hold the optics rigidly in a fixed position for viewing moving documents subsequently advanced through the document feeding assembly 30.

Further details of the inhibitor and lock-out means 50 may be obtained by reference to the above-noted Hoppner et al [1] patent.

The machine which has been discussed thus far is similar in many respects to the aforenoted Xerox 3100 LDC copier. It is capable of operating in a number of modes including a scanning mode wherein a stationary original is scanned by the moving optical system 24 as well as a moving original mode wherein the original itself is moved in synchronism with the peripheral velocity of the drum and the optical system is held stationary. This latter approach is useful principally in a single copy mode in the apparatus described, however, it facilitates the copying of originals having a size larger than the platen.

In accordance with the present invention yet other or different modes of operation may be provided for a reproducing machine. One different mode of operation comprises a reduction mode wherein the image on the original is reduced in size by the optical system for projection onto the photosensitive surface whereby the image which is transferred to the sheet of final support material is similarly reduced in size. In accordance with the reproducing machine of this invention, the reduction mode is accomplished by a moving original exposure system.

For the reduction mode of operation it is necessary to change the lens 25 position to change the conjugate distance between the lens and the object and image planes. Further, it is necessary to advance the document past the fixed optics 24 at a velocity greater than the peripheral velocity of the drum S.

In accordance with a preferred embodiment of the present invention, the previously noted optical system of the Shogren patent is modified to provide for the insertion of a second lens 25' and the insertion of an add mirror 60 to redirect the optical path to change the platen 23 to lens conjugate. The optical system which is utilized herein is similar in some respects to that described in application, Ser. No. 588,974 to Spinelli et al. The optical system of that application provides in addition to the optical system of the Shogren patent an add reflector 60 which is selectively positionable into the optical path to combine with the half rate mirror 27 to form a reflection cavity and change the object distance for magnification change.

By the nature of a half (Catadioptric) lens 25 with its associated reflector 28 the optical path incident to the lens and reflected back through the lens is at some angle relative to the lens axis. When a magnification change necessitates repositioning of the lens, by insertion of the second lens 25' in accordance with this invention, the second lens operative position must take into account the divergence of the lens axis and optical path. In the optical system described in the aforenoted Spinelli et al application, the insertion of the add reflector 60 displaces the optical path 61 to 61' and, therefore, the lens 25' with its lens reflector is operatively positioned to satisfy conjugate distance requirements and to remain centered on the optical (principal ray) path 61'.

In order to obtain varying projected image magnifications by moving original exposure, it is necessary to advance the document past the optical viewing system at a velocity which varies depending upon the magnification which is selected. Various drive mechanisms are known which would enable the document feeder 30 to be driven selectively at one of a plurality of desired speeds corresponding to the given magnifications or minification selections. See, for example, that described in the Hoppner et al [2] application and in U.S. Pat. No. 3,320,275 to Hewes et al.

The magnification changing mechanism 11 in accordance with the present invention includes the second lens 25' which is arranged for movement between a first stored position where it is inoperative and a second position where it is operative to project an image of the document onto the photosensitive surface P at a projected image magnification different than that provided by the lens 25. In its operative position the lens 25' is positioned forward of or in front of the lens 25 so that it interferes with or blocks part of the optical ray path 61. Therefore, it is necessary when employing the mode of operation utilizing lens 25 to store lens 25' at a position wherein it is outside the field of the optical ray path 61.

Commensurate with the positioning of the second lens 25' in its operative position an add reflector 60 is inserted in the optical ray path 61 to redirect it to 61' and to form a reflection cavity with the half-rate mirror 27 in order to change the conjugate relationship on the object side of the lens. The first lens 25 is out of the field of the optical ray path 61' so that it is inoperative when the lens 25' and add mirror 60 are operatively positioned.

A means for conditioning the apparatus 10 for moving original exposure has already been described. To condition the apparatus 10 for moving original exposure at a desired projected image magnification, a switch 65 as in FIG. 1 is provided to appropriately signal the machine control system 68 to condition the apparatus 10 in the first mode of moving original exposure which employs the stationary lens 25 and the fixed scanning mirrors 26 and 27 in accordance with the 3100 LDC approach or in the alternative mode of moving original exposure wherein lens 25' is translated from its stored position to its operative position in front of the lens 25, and the add mirror is pivoted from its stored position (shown in phantom) out of the optical path 61 to its operative position (shown in solid lines). The machine control system does not form part of the present invention and any desired system could be employed.

Referring now to FIGS. 1 - 4, the magnification changing mechanism 11 in accordance with the present invention will be described in greater detail. The magnification changing mechanism 11 in accordance with a preferred embodiment includes a frame 70. A pair of parallel spaced apart guide rails 71 and 72 are rigidly supported in the frame and a lens carriage 75 supporting lens 25' is slidingly supported upon the guide rails for movement between the operative position shown in solid lines wherein the lens is positioned in the optical ray path 61' and an inoperative stored position as shown in phantom in FIG. 4. In the stored position the lens 25' is positioned outside the domain of the optical ray path 61.

The second lens position and orientation is controlled by the way in which it is positioned on the lens carriage 75. Therefore, if it is desired to tilt the second lens 25' as compared to the arrangement of the first lens 25 to avoid vignetting as in the aforenoted Hoppner et al application, the second lens is supported in the tilted orientation on the lens carriage. Similarly, the position of the lens 25' vertically upwardly or downwardly of the first lens 25 may be set as desired by appropriately positioning the lens 25' on the lens carriage 75 or by appropriately positioning the magnification changing mechanism frame 70 in the reproducing apparatus 10.

A substantial advantage of this apparatus 11 over other approaches is the fact that the lateral displacement of the lens 25' in a generally horizontal direction may be set as desired in order to obtain any desired copy image registration position on the resulting copy sheet and can be easily changed. The use of a two lens arrangement as in this invention offers great flexibility in adjusting the copy image registration on the copy sheet. Some adjustment of conjugate can also be obtained by adjusting the position of the lens on the lens carriage longitudinally of the optical path. The use of two lenses also allows the focal length to be varied between the lenses to provide additional flexibility for magnification change. The use of two lenses 25 and 25' of the same focal length is preferred, however, in view of the economy associated with such commonality.

The lens carriage 75 is driven by a motor 80.

The motor 80 imparts motion to the lens carriage drive pulley 81 by means of the bevel gears 82 and 83. The drive pulley 81 is operatively connected to the lens carriage 75 by means of a drive cable 85 which is wrapped about the drive pulley and secured at one of its ends to one side of the lens carriage. The other end of the cable is wrapped around the idler pulley 86 and secured to the other side of the lens carriage 75. Compliance springs 89 are inserted in runs 87 and 88 of the drive cable 85 so that the carriage 75 may be overdriven against stops 90 and 91 which are arranged at the respective operative and inoperative positions. Stop 90 comprises an adjustable set screw for providing the critical adjustment of the operative position which controls the copy image registration on the copy sheet.

Upon selection of a desired mode of moving original exposure by means of a selector switch 65 if the lens carriage 75 is not already positioned in the desired position for that mode the carriage is translated until it engages the opposing stop member. Upon engaging the stop member the carriage is held at the desired position and a limit switch 93 or 94 is actuated, which by means of any desired circuitry (not shown) serves to stop the motor 80 after a desired interval of over-drive so that the carriage is sufficiently biased against the stop so that the lens will not be subject to shifting during operation which could adversely affect image quality. Similarly, when the alternate magnification mode of exposure is selected, the lens carriage 75 is translated in the opposing direction until it reaches the opposing stop member. Upon engaging the opposing stop member it actuates the opposing limit switch 93 or 94 which serves to stop the motor after a pre-determined interval of over-drive. The compliance springs 89 in the drive cable 85 allow the drive pulley 81 to continue to rotate and advance the cable even though the carriage 75 has stopped. The compliance springs 89 are effective to bias the carriage 75 against the respective stop 90 or 91 to hold it at the desired position.

The add mirror 60 is mounted on a pivoting carriage 100. The carriage is shown in its operative position in solid lines and in its inoperative position in phantom. An adjustable stop 101 is provided for accurately controlling the position of the add mirror when the carriage is in its operative position. The add mirror 60 is driven to its operative position or vice versa simultaneously with the repositioning of the second lens 25'. A cable 104 is wrapped around the shaft 105 of the drive pulley 81 and pinned thereto at one end. The cable 104 is secured at its other end to an idler pulley 106 pinned to the add mirror drive shaft 108. A second cable 110 is wrapped about and secured to the add mirror drive shaft 108 at one end. The cable 110 passes about a second idler pulley 111 and is secured about pulley 112 pinned to shaft 113 secured to the add mirror carriage 100. The shaft 113 is journaled in the frame 70. A compliance spring 115 is provided in the run 116 of the cable 110 to allow the mirror carriage 100 to be over-driven against the adjustable stop 101 so that it is biased in its operative position.

The cable driven arrangement allows a single drive motor to advance both the lens carriage and the mirror carriage between their respective operative and inoperative positions.

It is possible, in accordance with the present invention, to provide an optical magnification changing mechanism supported independently of a conventional optical system and which includes optical elements such as the second lens 25' and add mirror 60 which are selectively positionable in and out of the optical system to change the projected image magnification.

The second lens, in accordance with this invention preferably is translatable in a direction generally transversely of and normal to the optical ray paths.

It is not essential in accordance with the present invention to maintain a common registration edge on the copy sheet for both the base and reduction modes of operation.

In the disclosed optical system changing the conjugate distance effects changes in the projected image magnification according to the following relationship:

$$TC = \left[\frac{f + \frac{f}{m}}{\cos \alpha}\right] + \left[\frac{f + fm}{\cos \alpha}\right]$$

wherein:

| | |
|---|---|
| TC | Total Conjugate |
| f | Lens Focal Length |
| m | Magnification |
| $\frac{f + \frac{f}{m}}{\cos \alpha}$ | Object Conjugate |

-continued

| | |
|---|---|
| $\frac{f + fm}{\cos \alpha}$ | Image Conjugate |
| $\alpha$ | Angle between optical axis and lens axis |

For purposes of this application the total conjugate is defined as the distance along the principal ray from the object plane of the image plane. The object conjugate is defined as the distance along the principal ray from the object plane to the first nodal point of the lens and the image conjugate is defined as the distance along the principal ray from the image plane to the second nodal point of the lens.

The conjugate changing means in accordance with this invention has been described as being positioned on the object side of the lens, however, it should be apparent that if desired conjugate changing means could be employed on the image side of the lens.

While the invention has been described by reference to embodiments employing two scanning mirrors and a half lens in the optical system any desired optical system adapted to provide moving original exposure could be employed. It is not essential in accordance with the present invention to have a stationary original mode of exposure. If there is a stationary original mode of exposure the scanning need not be carried out by moving mirrors, e.g., a moving lens or other alternatives could be employed. If reflectors are employed in the optical system of this invention, they need not be mirrors since other optical elements of a similar nature could be used.

The patents, patent applications, and texts specifically set forth in this application are intended to be incorporated by reference into the description.

The term electrostatographic as employed in the present application refers to the formation and utilization of electrostatic charge patterns for the purpose of recording and reproducing patterns in viewable form.

It is apparent that there have been provided in accordance with this invention apparatuses which fully satisfy the objects, means and advantages set forth hereinbefore. While the invention has been described in conjunction with specific embodiments therefor, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. A multi-mode reproducing apparatus for copying documents selectively at one of a plurality of copy image magnifications comprising:

an imaging surface arranged for movement at a given velocity;

optical means for viewing a document and for projecting an image thereof onto said surface, said optical means including a first fixed lens which is not movable to change projected image magnification and means for supporting said lens in a stationary position, said first lens being arranged to project an image of said document onto said surface at a first projected image magnification, and a second lens and means for supporting said second lens for movement between a first stored position where it is inoperative and a second position where it is operative to project an image of said document onto said surface at a second projected image magnification different from said first magnification;

means for selectively employing said first lens or said second lens for viewing said document;

said first lens being arranged along a first optical ray path extending from said document to said imaging surface, said second lens in said operative position being arranged along a second optical ray path from said document to said surface different from said first optical ray path, and said employing means including means for redirecting said first optical ray path to form said second optical ray path;

said redirecting means comprising a first reflector member selectively positionable into said first optical ray path;

said optical means including a second reflector member arranged to stripwise scan said document, said second reflector member being arranged to receive optical rays from said document and reflect them toward said lens, said first reflector being arranged in its operative position to receive reflective rays from said second reflector and reflect them back to said second reflector for reflection to said lens, whereby said first and second reflector selectively form a reflection cavity for conjugate change.

2. An apparatus as in claim 1, further including means for fixing said second reflector at a given position along its path of travel and means for feeding said document past said fixed second reflector at a velocity proportionally synchronized to the velocity of said imaging surface.

3. An apparatus as in claim 1, further including a third reflector, said third reflector being arranged to stripwise scan said document at a velocity synchronized to that of said imaging surface, said third reflector receiving image rays from said document and reflecting them to said second reflector, said second reflector being arranged to scan at a velocity one-half the velocity of said first reflector.

4. A multi-mode reproducing apparatus for copying documents selectively at one of a plurality of copy image magnifications comprising:

an imaging surface arranged for movement at a given velocity;

optical means for viewing said document and for projecting an image thereof onto said surface selectively at one of said plurality of copy image magnifications, said optical means including:

a first fixed lens which is not movable to change the projected image magnification, said first lens being arranged to project an image of said document onto said surface at a first projected image magnification;

means for supporting said first lens in a stationary position;

a second movable lens and means for supporting said second lens for movement between a first stored position where it is inoperative and a second position where it is operative to project an image of said document onto said surface at a second projected image magnification different from said first magnification; and means for selectively employing either said first lens or said second lens, but not both in combination for viewing said document.

5. In a multi-mode reproducing apparatus for copying documents selectively at one of a plurality of copy image magnifications comprising:

an imaging surface arranged for movement at a given velocity;

optical means for viewing said document and for projecting an image thereof onto said surface, said optical means including: a first lens, said first lens being arranged to project an image of said document onto said surface at a first projected image magnification, said first lens being arranged along a first optical ray path extending from said document to said imaging surface; and means for redirecting said first optical ray path to form a second optical ray path from said document to said surface different from said first optical ray path; the improvement wherein:

said first lens is fixed and is not movable to change the projected image magnification, and wherein said apparatus further includes:

a second movable lens and means for supporting said second lens for movement between a first stored position where it is inoperative and a second position where it is operative to project an image of said document onto said surface at a second projected image magnification different from said first magnification, said second lens in said second operative position being arranged along said second optical ray path;

means including said redirection means for selectively employing either said first lens or said second lens, but not both in combination for viewing said document; and means for supporting said first lens in a stationary position, whereby when said second lens is in its operative position said first lens is rendered inoperative.

6. An apparatus as in claim 5, wherein said second lens in said operative position is arranged in front of said first lens so as to interfere with said first optical ray path, and wherein said second lens in said inoperative position is arranged outside said first optical ray path.

7. An apparatus as in claim 5, wherein said redirecting means comprises a first reflector member selectively positionable into said first optical ray path.

8. An apparatus as in claim 7, wherein said second lens and said first reflector member and independent of said optical system when said first lens is employed.

9. An apparatus as in claim 5, wherein said second lens is arranged for movement between said respective operative and inoperative positions laterally transversely of said optical ray paths.

10. An apparatus as in claim 5, wherein said second projected image magnification is reduced as compared to said first projected image magnification.

11. In a reproducing apparatus for forming copies of a document selectively at one of a plurality of copy image magnifications including: an imaging surface arranged for movement at a given velocity; means for veiwing a stationary document in a first mode of operation and for projecting an image thereof onto said imaging surface; means for viewing a document moving at a first velocity synchronized to the velocity of said moving imaging surface in a second mode of operation and for projecting an image thereof at a desired magnification onto said imaging surface; said viewing means in said first mode and said second mode of operation including a first lens positioned along a first optical ray path from said document to said surface; means for viewing a document moving at a second velocity synchronized to the velocity of said surface in a third mode of operation and for projecting an image thereof onto said surface at a magnification different from said desired magnification, said second velocity being different than said first velocity, and means for selecting between said modes of operation;

said first lens comprises a fixed lens which is not movable to change projected image magnification; and said viewing means in said third mode of operation includes a second lens arranged for movement between a first position wherein it is inoperative and a second position along a second optical ray path from said document to said surface wherein it is operative to project an image of said document onto said surface at said different projected image magnification; and said means for selecting between said modes of operation includes means for selectively employing said first lens for said first and second modes of operation or said second lens for said third mode of operation, but not both lenses in combination.

12. An apparatus as in claim 11, further including means for redirecting said first optical ray path to form said second optical ray path.

13. An apparatus as in claim 12, wherein said second lens in said operative position is arranged in front of said first lens so as to interfere with said first optical ray path, and wherein said second lens in said inoperative position is arranged outside said first optical ray path.

14. An apparatus as in claim 12, wherein said redirecting means comprises a first reflector member selectively positionable into said first optical ray path.

15. An apparatus as in claim 12, wherein said second lens is arranged for movement between said respective operative and inoperative positions laterally transversely of said optical ray paths.

* * * * *